(12) United States Patent
 Choplin et al.

(10) Patent No.: US 10,908,600 B2
(45) Date of Patent: Feb. 2, 2021

(54) METHOD AND DEVICE FOR MANAGING THE TEMPERATURE OF A MODULE OF A PRODUCTION LINE

(71) Applicant: SIDEL PACKING SOLUTIONS, Corcelles-les-Citeaux (FR)

(72) Inventors: Gregory Choplin, Corcelles les Cîteaux (FR); Jean-Yves Kuntz, Reichstett (FR); Franck Klotz, Laval (CA)

(73) Assignee: SIDEL PACKING SOLUTIONS, Corcelles-les-Citeaux (FR)

( * ) Notice: Subject to any disclaimer, the term of this patent is extended or adjusted under 35 U.S.C. 154(b) by 0 days.

(21) Appl. No.: 16/115,833

(22) Filed: Aug. 29, 2018

(65) Prior Publication Data
 US 2019/0064781 A1 Feb. 28, 2019

(30) Foreign Application Priority Data
 Aug. 30, 2017 (FR) ...................................... 17 57975

(51) Int. Cl.
 *G05B 19/00* (2006.01)
 *G05B 19/418* (2006.01)
 *G05D 23/19* (2006.01)
 *B65B 53/02* (2006.01)
(52) U.S. Cl.
 CPC .......... *G05B 19/4189* (2013.01); *B65B 53/02* (2013.01); *G05D 23/1917* (2013.01); *G05B 2219/32209* (2013.01); *G05B 2219/49051* (2013.01)
(58) Field of Classification Search
 None
 See application file for complete search history.

(56) References Cited

U.S. PATENT DOCUMENTS

2012/0155907 A1* 6/2012 Tanaka ................. G03G 15/205
                                                        399/69
2019/0278535 A1* 9/2019 Choi ..................... G06F 3/1259

FOREIGN PATENT DOCUMENTS

| EP | 2 688 180 A1 | 1/2014 |
| EP | 2 793 353 A1 | 10/2014 |
| WO | 2011/144231 A1 | 11/2011 |

OTHER PUBLICATIONS

FR Search Report, dated May 22, 2018, from corresponding FR1757975 application.

* cited by examiner

*Primary Examiner* — Paul B Yanchus, III

(57) ABSTRACT

The invention relates to a method for managing a main module (1) of a production line, with said main module (1) being equipped with thermal means that operate in production at a setpoint temperature (1000), method in which during production, when there is a break in production continuity at said main module (1), the temperature of said thermal means is lowered, and then their temperature is reset until said setpoint temperature (1000) is reached. Advantageously, at least data from a past event comprising at least one temperature rise time of said thermal means from a first temperature to a second temperature is recorded, and based on said data, the temperature of said thermal means is adapted automatically to reach said setpoint temperature (1000), at the latest when the production continuity resumes at said main module (1). The object of the invention is also a corresponding management device.

20 Claims, 4 Drawing Sheets

METHOD AND DEVICE FOR MANAGING THE TEMPERATURE OF A MODULE OF A PRODUCTION LINE

BACKGROUND OF THE INVENTION

Field of the Invention

This invention pertains to the field of optimizing energy consumption within a line for production and/or packaging of products.

In terms of this invention, the term "production" encompasses all aspects of "production and/or packaging of products."

Such a production line comprises at least one main module that is equipped with thermal means that are dedicated to the production of said products. The purpose of the invention is then the improvement of the energy expenditure of such a main module.

By way of a preferred explanatory but non-limiting example, said products can consist of containers, such as flasks, bottles, jugs, etc. Such products undergo a first so-called production phase during which they are completed one at a time through a series of several steps within corresponding modules, such as filling, capping, and labeling.

Such ready-to-use products then undergo a second step for packaging in batches, with each batch consisting of the grouping, staggered or not, of several products according to an arrangement in a matrix, generally parallelepiped, square, or rectangular. The products are kept together in a batch by a wrap that consists of a plastic film. This wrap is applied through a bundling step, by means of a dedicated module of the bundler type. In a complementary way, each batch can be held from below by means of a support that forms a bottom, for example a cardboard tray, in general positioned before wrapping and bundling. Exiting from this second packaging step, the products therefore come in a batch within which they are held in the form of bundles; for example, such bundles can then be arranged on a palette for the purpose of their handling and their transport.

For this purpose, the invention will find an application that is preferred but in no way limiting within a production line that comprises at least one main bundler-type packaging module.

Description of the Related Art

Ordinarily, such a bundler comprises a station for wrapping products in batches by means of a plastic film. Such a plastic film is provided in a heat-shrinkable form. Downstream, said bundler comprises a heating station, consisting of at least one furnace, in general consisting of several heating areas, passed through by each batch of wrapped products, making it possible for said film to retract and to assume the external shape of the batch of products, keeping them together. The batch that is thus wrapped and clamped by said retracted film is cooled upon leaving the furnace so as to impart an adequate mechanical strength to the batch that is thus kept wrapped for the purpose of its handling and its transport.

In a general manner, in terms of this invention, the bundler that is used for the packaging of products by batch makes it possible to operate at a high speed, i.e., automated, not requiring intervention by an operator for the processing of products in normal operation.

Consequently, the thermal means of such a main bundler module have consisted of at least one furnace that consists of one or more heating areas.

For several years, for reasons both economic and environmental, a constant objective has aimed to limit energy consumption within production lines. Consequently, very particular attention has been focused on the thermal means of the main module, consuming the most energy.

Within the framework of the explanatory example, a more particular effort is provided relative to the consumption of the bundler module, to the extent that its furnace is in general one of the most energy-intensive elements of a production line. This effort focuses more specifically on the installation of a management system that makes it possible to reduce energy consumption when the bundler is not operating, i.e., it cannot produce output, in particular because of an unforeseeable stoppage that has taken place along the line, for example because of a malfunction of another module that is located upstream or downstream on said line, or else in the case of jamming or dropping of a product or a batch of products, or else because of a failure at said bundler module. Another stoppage may be foreseeable, planned in advance as a change in format of the products that are to be processed or a maintenance operation, causing the stoppage of all or part of the production line, including the main bundler module. Actually, such an event can manifest itself as the halting of the routing of products along the production line, causing the bundler module, which is no longer supplied with products, to be put on standby, or else which can no longer supply the production line downstream. This standby state extends over a variable length of time that corresponds to the time that it takes to find a resolution for the cause of said stoppage and to restart the routing of the products. During the time of this stoppage, the furnace is in general kept at production temperature, needlessly consuming energy, while no product passes through it.

Moreover, at the outlet, the bundler comprises a station for cooling products that remains active in the event of a stoppage, while no product passes through it. The same is true for the other stations that constitute this bundler module, such as, for example, the means for cooling the return portion of the conveyor.

Several solutions have been conceived for the purpose of limiting energy consumption when a stoppage takes place along a production line. By way of example, the document WO 2011/144231 proposes the installation of closing means at the intake and the outlet of the furnace of the bundler. These means are activated by closing, when the bundler is not in a production phase, for the purpose of limiting heat loss toward the outside of the furnace via these thus blocked openings. However, the influence of this type of closure on energy consumption is slight, to the extent that a large amount of heat dissipates at the bottom, through the conveyor that transports the products through the furnace.

Another precarious solution consists, in the event of a stoppage, in manually lowering the temperature of the furnace during the stoppage of the production to a setpoint temperature. Once the causes of the stoppage are resolved, the heating of the furnace is restarted. However, based on the stoppage that has taken place and the length of time thereof for resolving it, but also based on the lowering of temperature linked to this length of time or to the setpoint temperature that is selected, the reactivation of said furnace, also carried out manually, can take a consequent lapse of time until it reaches the optimum temperature that is required for the bundling. In addition, this lapse of time varies based on each furnace but also on its age. This empirical technique in general brings about an increase in the length of time of the stoppage, the time that the furnace takes to return to its required temperature, while the rest of the line has already become operational again. Actually, the reactivation of the furnace in general takes place once it is certain that the problem has been resolved and once production is restarted. Thus, this solution is only rarely considered, increasing even more the loss of time on the line.

There is therefore a real need to improve on what already exists for the purpose of a significant savings of the energy consumed by the thermal means in the time of disuse of a main module, such as a bundler, in the event of a stoppage taking place along the production line. In particular, the solution should in no way impact the operation of the line, i.e., the bundler is to be under conditions of optimal use as soon as production resumes normally, in particular when the routing of products resumes in a normal way along the line, ensuring again the supply of said bundler module and that the latter can supply the production line downstream.

SUMMARY OF THE INVENTION

From this standpoint, the invention envisions integrating an automatic learning system that makes it possible to store at least past data for the purpose of ensuring an optimum yield of the production line, while saving energy. More specifically, in the event production is stopped within said line, the invention provides in an automatic way to decrease and then to increase the temperature of the thermal means of the main module, for example the furnace of a bundler module. Earlier, when a stoppage takes place, the invention determines to what temperature it is possible to lower the thermal means, on the basis of said past data that are collected when an event has taken place, in particular during a similar past event that recurs.

Advantageously, the invention takes into account the known rise in temperature of the thermal means, namely of the furnace and its heating area(s), to know the temperature rise time that it takes for said furnace to reach the optimum operating temperature, so-called "setpoint temperature." Starting from this rise time, the invention determines with precision when and/or at what lower temperature value the heating of the thermal means is to be restarted.

In the case of an expected stoppage, since the length of time is known, it is possible to determine the minimum temperature to which the temperature of the thermal means is lowered, optionally for how much time to keep it at this threshold, to control again the increase in temperature on the remaining time range, which then corresponds to the time that it takes to pass from said minimum temperature to the setpoint temperature.

In the event of an unexpected stoppage, not knowing the length of time that it takes for said stoppage to be resolved, the invention provides for extrapolating a length of time of a stoppage and/or a minimum temperature value compared to past data, previously recorded relative to a similar past event. The invention then acts in the same way, decreasing the operating temperature of the thermal means to a minimum temperature, optionally keeping it at this threshold, until the time when it is necessary to increase the temperature again to reach the setpoint temperature in terms of a comparative theoretical length of time.

Thus, the invention makes it possible to look ahead to the return to production, while saving energy, for stoppages of short or long duration.

In addition, with the invention recording data over time, the management system is adapted to the proper operation of each production line. In addition, with the invention recording data over time, the management system provides an improvement in the precision of prediction of the temperature rise time and the adaptation. The prediction can be made in real time and in an individualized manner for each main module of each production line. Actually, the invention makes it possible that the properties and performances that are inherent to the main module and also to the production line are taken into account in the adaptation of the temperature to reach the setpoint temperature. This makes it possible, for example, to take into account the aging of the main module and/or any manufacturing defect that is particular to the main module. The invention therefore makes possible learning that is not only autonomous but also individualized, and finally an improvement in energy savings while having no impact at all on the operation of the production line.

As a result, as its implementation proceeds, the invention automatically refines its data, optimizing the energy management of said production line.

For this purpose, the invention relates to a method for managing a main module of a production line, with said line comprising at least one module that is located upstream or downstream from said main module, with said main module being equipped with thermal means that operate in production at a setpoint temperature, method in which:

During production, when there is a break in production continuity at said main module over a period of time, the temperature of said thermal means is lowered;

Then, the temperature of said thermal means is reset until said setpoint temperature is reached.

Such a management method is characterized in that:

Data comprising at least past data are recorded, with said past data regarding at least one past event and comprising at least one temperature rise time of said thermal means from a first temperature to a second temperature;

Based on said data, the temperature of said thermal means is adapted automatically to reach said setpoint temperature, at the latest when the production continuity resumes at said main module.

Note that the past events can be categorized, in relation to the module where they take place, with their probable causes or else any characteristic that defines them. According to other additional, non-limiting characteristics of the method, the past event is a past event that has taken place during production. An event can be recorded, per the invention, by producing data that are representative of the event. The data that are representative of the event can have a data structure that comprises a type of event that is indicative of the event, and/or one or more parameters that are indicative of the event. A type of event can be indicative of a stoppage (for example, a planned (or expected) stoppage and/or an unexpected stoppage), indicative of a module problem, indicative of maintenance, indicative of resupplying, indicative of a periodic event, indicative of a production line, indicative of an interruption at another upstream and/or downstream module, and/or indicative of the product (or type of product) in production. A parameter that is indicative of the event can comprise a length of time of the event, an indicated temperature of the event, a periodicity of the event, and/or a frequency of the event.

According to other additional, non-limiting characteristics of the method, said past data can comprise:

A prior length of time during which the temperature of said thermal means was lowered and then reset;

A length of time of resolution, during which a specific problem that took place at said main module, said upstream and/or downstream module, has been resolved; and/or A length of time that it takes for production to resume between said main module, an upstream module and/or a downstream module.

According to other additional, non-limiting characteristics of the method, said data can have a data structure that comprises a data category indicator, and/or a data type indicator. The data category indicator can identify the cause of a stoppage, such as the element, the area or the station responsible, as well as the values of the lengths of time relative to the time that it takes for repair or maintenance to be effected for each element, area or station in question. According to other additional, non-limiting characteristics of the method, said data can be indexed based on their category that is indicated by a data category indicator. According to other additional, non-limiting characteristics of the method, said data can be indexed based on the data type indicator. According to other additional, non-limiting characteristics of the method, said data can have a data structure that comprises an identifier of the module in question. According to other additional, non-limiting characteristics of the method, said data can be indexed according to the identifier of the module in question.

Additionally, it is possible to record known data within said data, with said known data relating to a setpoint and comprising:

A planned length of time for stoppage of the travel of products along said production line; and/or a length of time that is estimated and acquired by an operator.

It is also possible to record multiple values of the same category of past data, and the most unfavorable value for adapting the temperature of said thermal means automatically is applied.

According to other additional, non-limiting characteristics of the method, said data can have a data structure that comprises a time parameter (for example, a time stamping of the data at the time when the data are recorded). According to other additional, non-limiting characteristics of the method, said data can be indexed based on their time stamping.

It is also possible to replace the oldest value from the same category of past data by a newly-recorded value. The replacement of an older value by a more recent value can be done by using the time stamp in the data at the time of the recording.

Said thermal means of the main module can comprise associated means, and it is possible to modify the operation of said associated means based on said data over said period of said stoppage.

The invention thus makes it possible to obtain a look ahead when a stoppage takes place on a production line, automatically decreasing the temperature of the thermal means of the main module compared to the setpoint temperature, during a specific length of time, based on said stoppage, while ensuring the normal resumption of production as soon as the causes of the stoppage are resolved, with no wait time. Actually, the return to the optimum operating temperature of the thermal means is anticipated, in such a way that at the time of the resumption of production along the line (at the latest when the products arrive and then travel onward in the area of the thermal means of the main module), said thermal means have already returned to said setpoint temperature that is required for the operation that the main module is to process. The precision of the look ahead can thus be improved by the invention. The look ahead can be made in real time and in an individualized manner for each main module of each production line.

The invention also relates to a device for managing at least one main module within a production line. The main module of such a management device comprises thermal means and means for monitoring at least the temperature of said thermal means.

Such a device is characterized in that it comprises management means that are provided:

With means for recording data including at least past data, with said past data comprising at least one temperature rise time of said thermal means from a first temperature to a second temperature;

With means for automatic control of said monitoring means applying at least an increase in said temperature of the thermal means based on said data.

According to other additional, non-limiting characteristics, said recording means of such a device can comprise means for selecting values for each of said past data. According to other additional, non-limiting characteristics, said selection means can select values for each of said past data based on the event that has taken place, and/or based on the time stamping of the data.

Said management device can comprise means for detecting a stoppage that takes place at said main module and/or an interruption at said upstream module and/or downstream module.

In addition, such a management device can be easily integrated over the entire production line, adapting to each main module, in particular to the bundler module, as well as to other upstream and/or downstream modules that are equipped with heating-type thermal means, for the purpose of optimizing the energy consumption of the entire production line.

The invention therefore makes it possible to look ahead to the return of production to normal, by automatically monitoring the length of time over which the temperature of the thermal means of said main module, in particular of the furnace of the bundler module, is modified, as well as optionally by monitoring other elements of the production line, and to automatically calculated values, optimizing to the maximum the energy savings based on the preceding events of the production line.

In this way, with the invention recording data relative to the events that took place previously, the more the production line is managed over time by the invention, the more precise the predictions will become and the smaller the energy consumption will become. The invention then has the characteristic of automatic learning, provided autonomously for the most part.

In particular, the invention makes a selection from among the data that are recorded during a stoppage and those recorded previously, ensuring that the values of the various types of data are up to date, replacing data that are obsolete or too old.

In addition, the invention envisions being able to take into consideration the most unfavorable data that are recorded, thus ensuring that, in the worst case, the management actions of the invention on the production line in no way impair its operation, in particular upon returning to the setpoint temperature of the thermal means of the main module.

BRIEF DESCRIPTION OF THE DRAWINGS

Other characteristics and advantages of the invention will emerge from the following detailed description of the non-limiting embodiments of the invention, with reference to the accompanying figures, in which.

DESCRIPTION OF THE PREFERRED EMBODIMENTS

Figure 1:
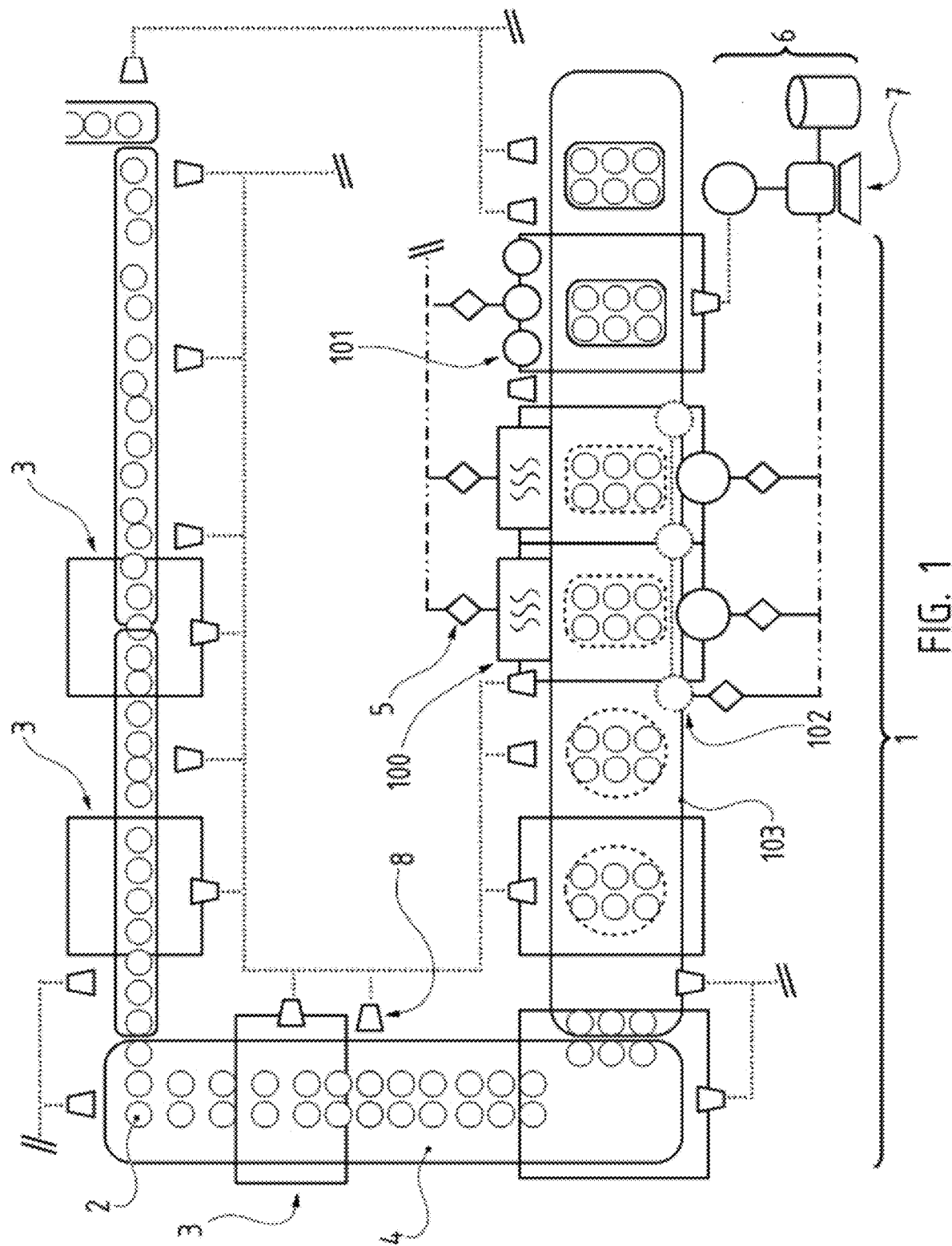
FIG. 1 diagrammatically and partially shows an example of a production line that is equipped with the management device according to the invention, showing in the lower part a bundler-type main module whose thermal means consist of a furnace that consists of two heating areas, a cooling module, and means for cooling the conveyor, with the figure also showing products traveling along said line through multiple other modules that are located upstream, up to this bundler module.

This invention relates to the management of a main module 1 of a line for production of products 2, for the purpose of decreasing its energy consumption.

Such a production line comprises at least one module 3 that is located upstream or downstream from said main module 1, preferably multiple upstream and/or downstream modules 3. Various operations are conducted successively through each module. Conveying means 4 ensure the transport of products from and to said upstream and/or downstream modules 3, as well as said main module 1.

With reference to the non-limiting example that is shown in FIG. 1, said main module 1 is located at the end of the production line, while three modules 3 are located upstream.

Said main module 1 is equipped with thermal means that operate in production at a setpoint temperature 1000. In the preferred example embodiment, said main module 1 is of the bundler type, and its thermal means consist of at least one furnace 100, in particular consisting of two heating areas.

In a subsidiary way, the thermal means can also comprise associated means, such as the means 101 for cooling products 2 that are exiting from said furnace 100 or else means 102 for adjusting the temperature of at least one conveyor 103 associated with said main module 1, in particular a conveyor 103 associated with the thermal means.

Within this framework, the invention provides that during production, when the production takes place continuously with all of the modules operating and when said products 2 travel normally through each of said modules, if a stoppage takes place and prevents said production continuity, namely when the progress of the products 2 is interrupted, at said main module 1, the temperature of the thermal means of said main module 1 is adjusted so as to limit the energy loss.

More specifically, the stoppage takes place at said main module 1 and can be triggered following an interruption that has taken place at another upstream and/or downstream module 3. In a generic way, unless specified otherwise, the term "stoppage" encompasses a stoppage at the main module 1 and an interruption at an upstream and/or downstream module 3.

Consequently, if a stoppage takes place, then the temperature of said thermal means is lowered. This drop may correspond to stopping the heating of the thermal means or else to the decrease according to or up to a determined value, for example by acting on the thermostat of each furnace 100, and even on the thermostats of the heating areas of each furnace 100.

Then, the temperature of said thermal means is reset until said setpoint temperature 1000 is reached. Note that the stoppage brings about an alteration of the production continuity over a period. Consequently, the resetting can take place during this time period, in particular in such a way that at the latest when the production continuity resumes at said main module 1, the temperature of its thermal means has reached the setpoint temperature 1000 that is necessary to the proper processing of the products 2. In other words, the thermal means of the main module 1 absolutely must be operational at the time when the products 2 again reach the usual rate of production of said line and/or exit from said main module 1, supplying the downstream of the production line.

In addition, the period over which the stoppage extends can correspond to the time that it takes to detect a problem and its cause, to adjust and to resolve the problem, until the production continuity returns. Said period can then be unknown, if the stoppage takes place for the first time, or it can be known in a precise or estimated way if a past event that is mutually similar or identical has already taken place. This period can also be known in the event of a stoppage of production that is envisioned.

Thus, the period of the stoppage breaks down into a first lapse of time during which the temperature of the thermal means has dropped, and then optionally kept at a minimum threshold value 1001 for a length of time, and into a second lapse of time during which said temperature is increased until returning to the value of the setpoint temperature 1000, optionally at the end of said minimum threshold length of time 1001. Note that this increase in temperature can be carried out continually or else in an intermittent way, namely that a plateau 1002 at a given temperature is carried out during a lapse of time between two successive increases.

In this context, the invention consists in data being recorded, in particular past data regarding at least one past event, preferably multiple past events. Consequently, when a stoppage that is new, similar or identical takes place on the production line, at one and/or the other of said modules, previously-recorded past data are already known, which data can be applied and/or compared to measured data that are then unknown or not recorded, relative to the stoppage that takes place and alters the production.

In connection with the past event of which certain aspects have been stored, said recorded past data comprise at least one length of time. The latter can correspond to all or part of the period of said past event.

Preferably, in the absence of past data recorded during a past event, at least one temperature rise time of said thermal means during their activation at the time said production is launched is recorded within said past data. This rise time between a first and second temperature is recorded. In other words, the time that it takes for thermal means to pass from a lower temperature to a higher temperature, preferably to reach their setpoint temperature 1000, is recorded. If the invention has only recorded past data relative to the activation of the thermal means, these are these past data that are taken into account for the next stoppage that takes place and alters the production continuity.

During the first activation, as well as other subsequent operations of the thermal means, the specifications issued by the manufacturer can be taken into account. These specifications can be combined with or replaced by the newly-recorded data.

In addition, said rise time can also be recorded, for the purpose of being taken into account subsequently, at any other time, in particular during a stoppage, following said controlled drop and during the monitored rise that follows.

Note that the recording of said length of time can be done by regular or irregular temperature intervals, with the lower and upper bounds of such intervals being respectively the first and second temperatures. Such intervals therefore represent a length of time between a delta of two temperatures, said first temperature and said second temperature.

Earlier, said rise time makes it possible to plot a rising curve, smoothed or otherwise, in the form of segments of straight lines that correspond to said intervals, modeling the temperature of the thermal means based on time. In particular, it is possible to determine the guide coefficients of each of the segments of straight lines, to perform linear extrapolations between two times or two temperature values, or else to calculate mean curves between two points.

Thus, starting from any temperature value of the thermal means, the time that it takes to reach the value of the setpoint temperature 1000 is known.

In this regard, the invention provides for measuring the temperature of said thermal means. These measurements can be performed continuously or at regular or irregular intervals. Thus, in addition to knowing the temperature of the thermal means, it is possible to determine the lapse of time that is necessary for raising the temperature of said furnace 100 and to adapt this time lapse over time, compensating in particular for the aging of said thermal means. Consequently, it is possible to calculate with precision and in real time the temperature rise speed of the thermal means.

In this regard, note that the measurement of the values of the rise time can be performed at each launching of production, when the thermal means are put into operation, until the setpoint temperature 1000 is reached. Said rise time can also be recorded during a preceding rise, following a stoppage that has been resolved. Thus, it is ensured that the recorded past data comprise at least one reference time, namely one or more time intervals so that the furnace 100 passes from a lower temperature to a higher temperature.

In addition, for thermal means that comprise multiple elements, for example two heating areas of the furnace 100, the invention records temperature rise times associated with each heating area, and it is possible to calculate an average of these temperature rise times for all of the heating areas.

More particularly, in an automatic way, the lowering of temperature can be performed by stoppage of thermal means and decreasing of the temperature until a low value is reached at the end of a time, with this low value becoming said minimum threshold 1001, starting from which the rise in temperature to the setpoint temperature 1000 will be initiated, because there remains a limited time that is known or estimated over the period.

Thus, by knowing in advance the rise in temperature of the thermal means and the length of time for carrying out this rise, the invention makes it possible to look ahead with precision to a reduction and then a rise in said temperature, according to values that are determined in advance or adjusted in real time, by matching throughout the period of the stoppage.

As previously mentioned, said data are at least past data, comprising at least the temperature rise time of said thermal means from a first temperature to a second temperature.

Consequently, the past events and the stoppages can be of different types, such as a stoppage that is envisioned of the production over a preset period, an unknown that blocks or slows the production continuity at a module, a failure of a module, or else maintenance operations.

As previously mentioned, said data of each past event are determined to be "past." The past data therefore refer to previously recorded values.

Past data can be of a prior length of time during which the temperature of said thermal means was modified and then reset. Actually, the invention can select the length of time of an identical or similar past event and apply it to the stoppage that takes place. Consequently, the shortest length of time that is recorded should be taken into account so as to ensure a good return to the setpoint temperature.

Note that the past events can be categorized, compared to the module where they take place, their probable causes, or else any characteristic that defines them. Consequently, values, including lengths of time, are recorded for each event for the purpose of categorizing it, making it possible to compare it to the stoppage and the categorization that is optionally done, to remove the recorded data and to apply them to the current management system. In the absence of a defined category of the stoppage, it is then possible to combine multiple categories of past events, to remove the most pertinent length of time value from among those of the past data. The most pertinent length of time is often the shortest, to be applied in the event of said present stoppage, so as to ensure that the setpoint temperature 1000 is reached, even if the stoppage should extend beyond. This most pertinent length of time can therefore be less than the period of the stoppage.

By way of non-limiting example, for the same module, multiple categories retain information aimed at the cause of the stoppage, such as the element, the area or the station involved, as well as the values of the lengths of time relative to the time that it takes for repair or maintenance, for each element, area or station in question. The categories can therefore be multiplied for each module and each of its elements that constitute it.

According to another example, categories can be determined, recording past data, aimed at each portion of the conveying means 4 and the causes of stoppages that can take place therein. Consequently, in this case, the conveying means 4 can be interpreted in an expanded way as being an upstream/downstream module 3.

Another past datum can be a length of time of resolution during which a specific problem that took place at said main module 1, said upstream and/or downstream module 3, has been resolved. In this case, said problem is known and identified, past data having already been recorded aimed at an identical past event. This length of time of resolution is therefore applied to envision the period of the stoppage. This length of time of resolution therefore requires the recording of complementary information aimed at the type of stoppage that takes place and the types of events that took place previously.

Another past datum can be a length of time that it takes for production to resume between said main module 1, an upstream and/or a downstream module 3. Actually, the invention takes into consideration the time that the products 2 take, once their travel is reset, to reach the main module 1 or the downstream module 3. Each length of time of resumption can therefore be listed based on the path to be traveled between various modules. This travel time lapse of the products 2, even minimum, can make it possible to lower the temperature to a small but still clearly significant extent over time.

According to another embodiment, alternative or complementary, said data can comprise known data that relate to a setpoint. These known data do not relate to a past event. In short, they are predefined data.

A known datum can be a planned length of time of the stoppage of travel of the products 2 along said production line. In other words, the invention makes it possible to adapt the temperature of the thermal means based on expected stoppages, with at least one determined schedule for resumption of production, preferably a known stoppage schedule, and another resumption schedule, determining specifically said period of the stoppage. The management system according to the invention makes it possible to raise the temperature at the right moment, after a reduction and optionally keeping to the minimum threshold 1001, still ensuring that at any time in this resumption, the temperature of the thermal means has reached the setpoint temperature 1000.

Another known datum can be a length of time that is estimated and acquired by an operator. The estimation can be provided automatically or else manually, in the case of a similar event that has taken place in the past, with regard to an identical module or a similar cause that has taken place along the production line. The invention then applies this estimated length of time that can be taken into consideration for the lowering, and then the rising of the controlled temperature.

This estimated length of time can comprise a length of time that is acquired by an operator. In this case, in general after a diagnostic, an operator can determine the value of the length of time to be taken into consideration. In other words, an operator already has the experience of a minimum length of time of estimated stoppage, for example for a different breakdown but one that comes close to a breakdown that has already taken place, with the return to normal always having lasted a minimum of time known to the operator. The unknown estimated length of time then becomes known at the time when it is provided by said operator. The latter can then find out about this minimum time. To do this, the invention provides at least one interface that is dedicated to this effect, making it possible to manually give information about said value of the acquired length of time, as well as other associated information, in connection with, for example, the causes and the module in question.

Note that the planned lengths of time—prior, determined, estimated and acquired—may or may not be combined, for the purpose of determining to what minimum threshold 1001 temperature can drop and/or up to what time before for the rise to be controlled.

Once these data are past and/or known from recorded lengths of time, the invention can also install a countdown system, before initiating the temperature rise, being given that the length of time that it takes to raise the temperature up to the setpoint 1000 is known.

Other information can be specified, in an automatic or manual way, in relation to each length of time and each type of past and/or known data, so as to classify them.

In a manual way, an operator can be responsible for acquiring all or part of said information. In an automatic way, the invention can provide suitable means so as to detect and record all or part of said information, in particular by means of detection means 8, such as sensors, positioned at certain locations of the production line and/or equipping the modules.

Additional computer means can ensure the recording and the management of data that are past and/or known by the invention. Such means can be provided in offset form, centralizing the acquisition by an operator, in particular by means of a man-machine interface, such as, for example, a computer terminal, provided in a stationary or movable form.

Consequently, it is possible to reset the temperature of the thermal means based on data that are at least past, if possible combined with known data.

In addition, it is possible to record multiple values of past data for each category, and the values of the most recent recorded past data are retained. In other words, a number of recordings for each type of length of time is defined in a maximum way, in particular randomly. During the recording of a new value of a length of time, the old value is eliminated, and the new value is recorded. The second oldest value will replace the oldest, and so on.

By way of example, when the main module 1 consists of a bundler, one category can be the length of time of resumption between the blower and the bundler during a stoppage that is caused by an interruption of said blower. Another category can be the length of time of resumption between a palletizing device and the bundler during a stoppage that is caused by an interruption of said palettizing device. Still another category can be the necessary length of time to change a defective mold of the blower, etc.

Moreover, it is possible to retain values of the most recent data, such as, for example, the updated data aimed at the rise in temperature associated with the furnace 100. Thus, it is certain that the furnace 100 is being continually adapted close to the reality of its current operation, taking into account its aging.

At the time of use of past data, the invention provides that the values of past data can be compared. The selection of the comparison is ensured in an unfavorable way, so that in any case, at the time of the resumption of the production continuity, the setpoint temperature is reached. In short, by taking into consideration the value of the most unfavorable datum, it is ensured that the furnace 100 will be ready earlier rather than later, in no way interfering with the proper resumption of production all along the line.

Most often, for a stoppage, it is the value that represents the shortest length of time from among all of the values of the past data recorded for the same category that is taken into account.

Conversely, for example, by considering a necessary length of time for turning on the thermal means until they reach the setpoint temperature 1000, if the new recorded length of time is longer than the previously-recorded length of time in the data, said new longer length of time is unfavorable and will be taken into consideration.

In addition, the invention can thus discard an erroneous datum, whose value would be offset and would exit from a logical interval. This offset value would be quickly compared and discarded, replaced by a value corresponding to reality and falling within said usual and normal operating interval.

By way of example, for each length of time, a number of recordings can be determined in a random way, in particular from one to ten.

In addition, a defined number of recordings can be dedicated to temperature ranges, according to a temperature differential, for example of 10 degrees Celsius, or else more and/or less than five degrees around a determined value. Consequently, this differential or "delta" can also be used to measure the temperature at regular time intervals, making it possible to obtain curves that model the variation of temperature by stages as a function of time. Conversely, by specifically measuring two first and second temperatures, it is possible to determine a time interval between the two.

The invention can also provide for applying incentives or penalties around values of recorded past data, for example at a ratio of five to ten percent, in such a way as to once again ensure that the thermal means are ready, at the setpoint temperature 1000, during the resumption of the production continuity, in terms of the period of the stoppage that has taken place.

In this regard, a terminated stoppage, once the production resumes, becomes a past event whose data have been recorded.

Consequently, it is noted that the invention distinguishes the problems that occur at the main module 1 and the problems that occur at the other upstream and/or downstream modules 3. Actually, an interruption at an upstream and/or downstream module 3 gives rise in particular to a length of time of routing products up to the main module 1.

Taking the example of a bundler-type main module 1, if it is known that said bundler cannot produce output for three minutes and that the recorded temperature rise is 20 degrees Celsius per minute, then the lowering of temperature of the furnace is controlled until a lower temperature is reached, defining said minimum threshold 1001, from which, once reached, by measurement or else by means of a countdown, the rise in temperature is controlled based on the remaining time corresponding to the necessary rise time between said minimum threshold 1001 and said setpoint temperature 1000. Thus, if the furnace 100 loses ten degrees Celsius per minute, it will drop in temperature for two minutes in order to lose 20 degrees Celsius, and then rise in temperature for one minute to reach its setpoint temperature 1000 again, or a total of three minutes after the initiation of this management operation.

Figure 2:
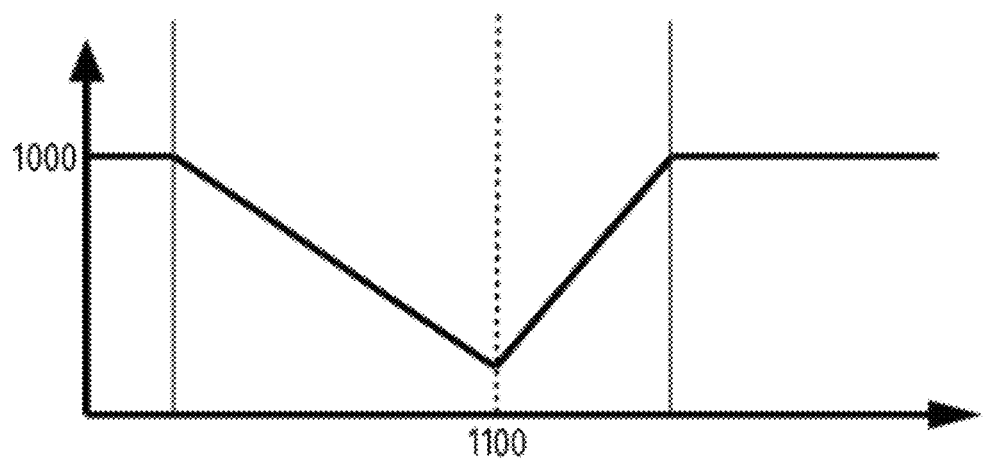
FIGS. 2 to 4 diagrammatically show three examples of changes in the value of the temperature along the ordinate axis based on time along the abscissa axis, showing three different possibilities among others of management according to the invention.

In a generic way, FIG. 2 shows a drop in temperature from the setpoint temperature 1000 to reach a low temperature, at a time 1100, which determines the starting point of the rise in temperature, based on the lapse of time remaining in the period of the stoppage, but also based on the rise time that this low temperature reached up to said setpoint temperature 1000.

In this case, the period of the stoppage is known in a minimum way. Even if the stoppage is extended, it is certain to have reached the setpoint temperature 1000 again at the time of or before the end of said period. In FIG. 2, the known minimum stoppage period can correspond to the length of time that runs between the time when the temperature of the furnace begins to decrease until the setpoint temperature 1000 is reached again.

Typically, this figure can illustrate the case where the invention uses the combination of a past datum, namely at least one temperature rise time of the furnace, corresponding to the increasing slope, combined with a known datum, namely a planned length of time of stoppage or an estimated length of time of stoppage, corresponding to the two decreasing and increasing slopes.

In short, a known period is used, and the temperature of the furnace 100 is decreased until the value of the measured temperature crosses the upward curve of the rise in temperature, determining said time 1100. It is then certain that at this crossing time, the time that it takes to rise to the setpoint temperature 1000 remains, and the temperature rise of said furnace 100 is immediately controlled.

Figure 3:
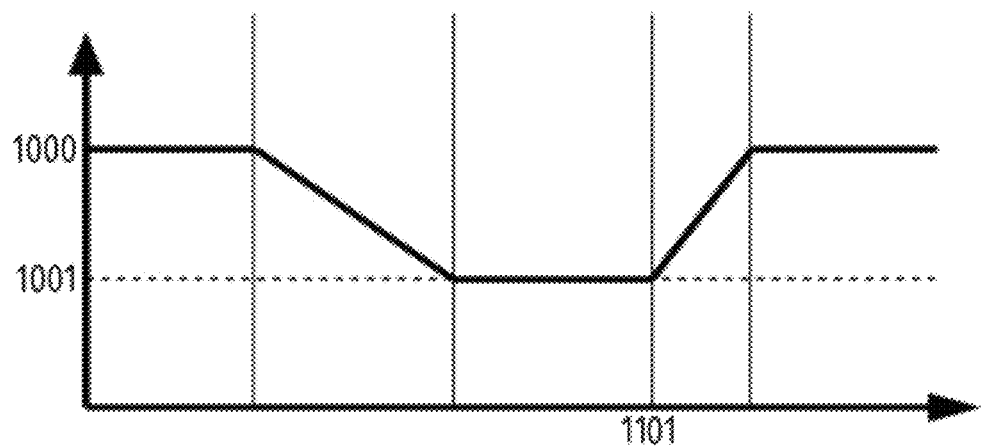

In a generic way, FIG. 3 shows a drop from the setpoint temperature 1000 to the minimum threshold 1001. The length of time of holding at said threshold 1001 then depends on the value of its temperature and the length of time that it takes to rise, always based on past data, namely at least the temperature rise time of the furnace 100, which may or may not be combined with other past and/or known data. This length of time therefore stops at a time 1101 from which the rise in temperature is controlled.

In this case, this may be a very slight drop in temperature, making it possible to return very quickly to the setpoint temperature 1000. Typically, FIG. 3 can illustrate the case where the invention uses the combination of two past data, namely at least one temperature rise time of the furnace 100, with at least one length of time that it takes for production to resume between the main module 1 and an upstream or downstream module 3. In this case, the stoppage of the main module 1 has been caused by, for example, the interruption of an upstream module 3. The temperature 1001 is then determined in such a way that when the production resumes at the module 3, at the time 1101, the furnace 100 uses the time that it takes to reach the setpoint temperature 1000 at the time when the main module 1 can resume production.

Figure 4:
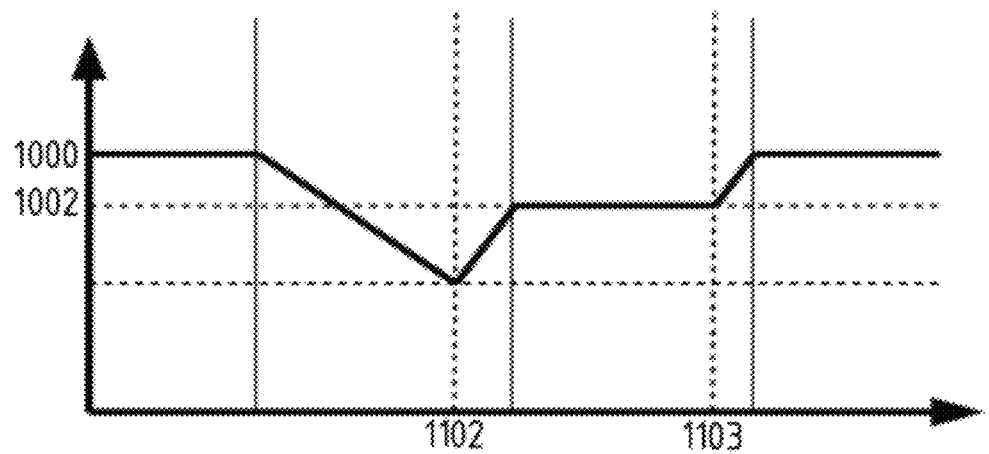

In a generic way, FIG. 4 shows a drop from the setpoint temperature 1000 to a time 1102, for example when a minimum temperature is reached. At this time 1102, the temperature is then raised to reach said plateau 1002, which is held until another subsequent time 1103, determining the end of said plateau 1002 and beginning the continuation of the temperature rise.

Consequently, said rise time can be cut in two, to correspond to each successive rise, before and after said plateau 1002.

This case is particularly suitable when the minimum length of time of stoppage of an upstream or downstream module 3 is known, for example when it is a stoppage that is identical to a past event.

This FIG. 4 can, for example, illustrate the case where an upstream module 3 is interrupted, then causing the stoppage of the main module 1. The minimum length of time of stoppage of the module 3 is estimated by, for example, an operator, who acquires this length of time, but the effective length of time of stoppage of the module 3 in reality proves longer than the estimated minimum length of time.

Consequently, the invention then combines the following data to optimize the energy consumption of the furnace 100:

a) A past datum corresponding to at least one temperature rise time of the furnace;

b) A known datum corresponding to the estimated length of time of stoppage of the module 3; and c) A past datum corresponding to at least one length of time that it takes for production to resume between the module 3 and the main module 1.

In this FIG. 4, the estimated length of time of stoppage of the module 3 ends when the furnace 100 reaches the plateau 1002. Thanks to the invention, the value of temperature 1002 is determined based on the above-mentioned data a) and c), so that the furnace 100 uses the time that it takes to reach the setpoint temperature 1000 at the time when the main module 1 can resume production starting from the temperature 1002, by considering that the temperature of the furnace 100 is raised when the module 3 effectively resumes production, namely starting from the time 1103.

The invention also determines the time 1102 during which the temperature of the furnace 100 is raised so that it reaches the temperature 1002 at the end of the estimated minimum length of time of the module 3. This time is determined using data a) and b) above.

In a subsidiary way, said thermal means of the main module 1 can comprise associated means, such as cooling means 101 or adjusting means 102 of the conveyor 103. The invention then provides for modifying the operation of said associated means based on data, namely said length of time that is taken into consideration. Actually, since the temperature of the thermal means is lowered, it is then possible to modify the behavior of the other elements of the main module 1, over the determined or selected length of time. The return to normal operation of the associated means can be performed before or simultaneously to the rise in temperature. By way of example, the speed of the conveyor 103 can be slowed down or stopped, just like the adjusting means 102 ensuring its cooling, which can be raised to a higher temperature, since the thermal means heat less. According to another example, the cooling means 101 of the products 2, not receiving more products 2 to cool, can be slowed down or stopped in the same way. This same management principle can be applied to the other upstream and/or downstream modules 3 of the production line.

If the main module 1 is equipped with associated sealing means of its intake and/or its outlet, then the invention can control the closing, to limit heat loss from the thermal means to the outside, and then in terms of the length of time, to reopen the intake door just before the products 2 arrive at the intake, and reciprocally for the outlet, while taking into account the known lengths of time for opening and closing said doors.

In other words, starting from the time when the lowering and raising of temperature of the main module 1 is monitored in a predetermined way, it is possible to establish a standby mode on various elements of said main module 1, as well as optionally elements of one and/or the other of the upstream and/or downstream modules 3.

The invention therefore relates to a method that uses one and/or the other of the above-mentioned steps.

The invention also relates to a device for managing at least one main module 1 within a production line.

As mentioned above, said main module 1 comprises thermal means and monitoring means 5 of at least the temperature of said thermal means. These monitoring means 5 can be thermostats. The thermal means can consist of at least one furnace 100. Such a furnace 100 can comprise multiple heating areas.

According to the invention, said device comprises management means 6 provided with data recording means, including at least one temperature rise time of said thermal means from a first temperature to a second temperature.

Said management means 6 are also provided with automatic control means 7 of said monitoring means 6 that apply to at least one rise in said temperature of the thermal means based on said past data. Said control means 7 therefore make it possible to interact on the temperature of the furnace 100.

In addition, said recording means can comprise means for selecting values for each of said past data. These selection means make it possible to sort the data, consult them, compare them, modify them, etc.

Said device can comprise means 8 for detecting a stoppage that takes place at said main module 1 and/or said upstream and/or downstream module 3. These detection means 8 can be one or more measuring sensors, such as thermal sensors that make it possible to measure the temperature of said thermal means, namely of the furnace 100.

These sensors also make it possible to detect other information at the main module 1 and/or the other upstream and/or downstream modules 3. Said sensors can be arranged at precise locations along the production line, such as, for example, at the intake and outlet of each upstream and/or downstream module 3 and/or the main module 1, as well as in the interior. These sensors can make it possible in particular to detect a failure of the module in question, a poor positioning of the products 2, such as a drop, etc. To do this, the sensors have the type of detection that is adapted based on their location and their role. Said sensors are then connected to the management means 6 for the purpose of transmitting signals relative to the detection.

Note that the management means 6 can be connected to sensors that are already in place at the modules, for the purpose of recovering detection and operation information that is already supervised by the monitoring means that are associated with each module.

The detection means 8 therefore make it possible to determine at the earliest in an automatic way when a stoppage takes place at said main module 1 and/or said upstream and/or downstream module 3, for the purpose of transmitting these data to the management means 8.

Thus, through the management of the operating temperature of the thermal means of the main module 1, optionally its associated means and/or other upstream and/or downstream modules 3, the invention makes it possible to look ahead to—from previously-recorded data (such as that recorded during production) and known data—a reduction and then primarily a monitored rise in said temperature, according to values that are calculated based on lengths of time that are taken into consideration, decreasing the energy expenditure during these times.

The invention provides for the rise based on in particular past data and optionally also based on known data, and, thus, induces in a way that may or may not be determined what reduction can be envisioned from said rise that is provided.

Moreover, by updating compared and recorded, measured past data, the invention has an automatic learning aspect, improving its performance over time and with the occurrence of stoppages.

The invention will find a maximized application in the management of the main module 1, whose thermal means have a heating and/or cooling inertia.

Figure 5:
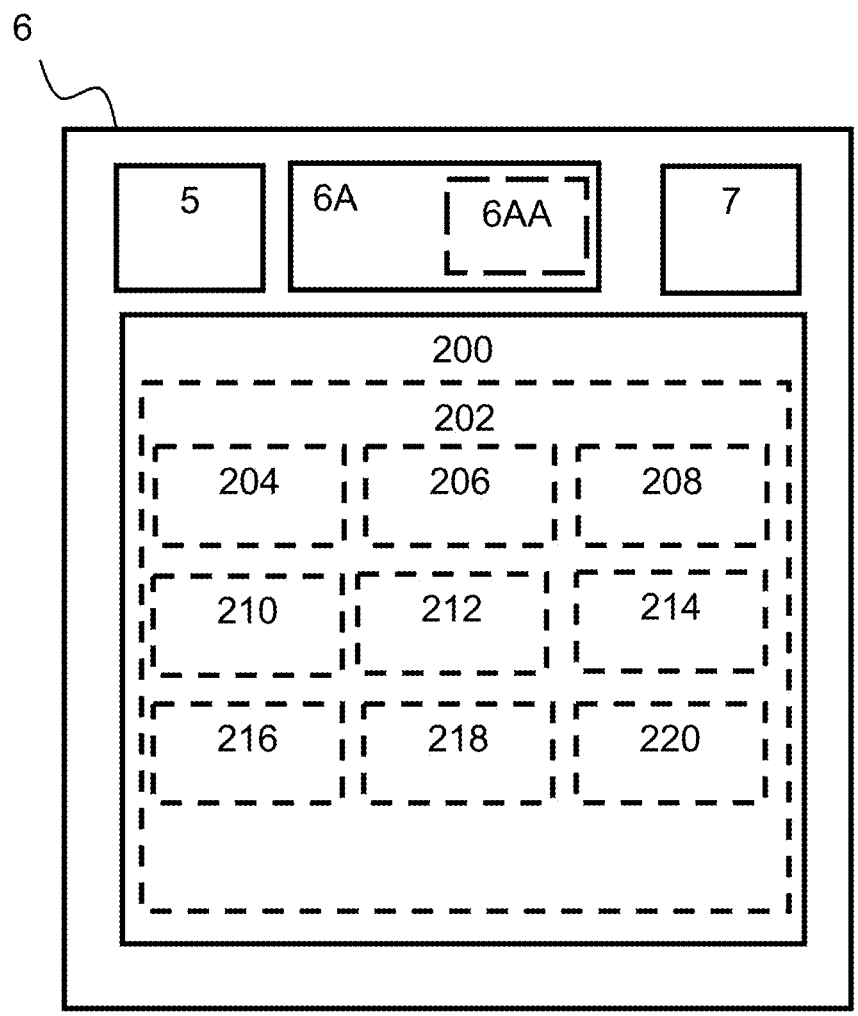
FIG. 5 diagrammatically shows an example of a management device according to the invention.

With reference to the non-limiting example that is shown in FIG. 5, means 6 for management of a management device of at least one main module within a production line are shown diagrammatically. Said main module comprises thermal means and monitoring means of at least the temperature of said thermal means. The management means 6 are provided with data recording means 6A including at least past data 202, with said past data 202 regarding at least one past event and comprising at least one temperature rise time 204 of said thermal means from a first temperature to a second temperature.

The management means 6 are provided with automatic control means 7 of said monitoring means 5 applying at least a rise in said temperature of the thermal means based on said data 200.

The management means 6 can be provided with a processor that can carry out the method that is presented.

The management means 6 can be provided with data storage means 200. The data storage means 200 (such as a memory) are able to store said past data 202 regarding at least one past event and comprising at least one temperature rise time 204 of said thermal means from a first temperature to a second temperature. The data storage means 200 (such as a memory) are able to store said past data 202 in such a way as to use a chronology that reflects the inherent properties of the main module or upstream or downstream module.

Said past data 200 can comprise data 206 that are representative of a past event. The representative data 206 of the event can have a data structure that comprises a type of event that is indicative of the event, and/or one or more parameters that are indicative of the event. Said data 202 can have a data structure that comprises a data category indicator 208 and/or a data type indicator 210. Said data 202 can be indexed based on their category that is indicated by a data category indicator 208 and/or the data type indicator 210. Said data 202 can have a data structure that comprises an identifier 212 of the module in question. Said data 202 can be indexed according to the identifier 212 of the module in question. Said data 202 can have a data structure that comprises a time stamping 214 of the data at the time when the data are recorded. Said data can be indexed based on their time stamping 214.

Said past data 202 can comprise a previous length of time 216 during which the temperature of said thermal means is lowered and then reset; a length of time 218 of resolution during which a specific problem that has taken place at said main module, said upstream and/or downstream module, is resolved; and/or a length of time that it takes for production to resume between said main module, an upstream and/or downstream module.

Said recording means 6A can comprise means 6AA for selecting values for each of said past data. The selection means 6AA are able to select values for each of said past data. Alternatively, or additionally, the selection means 6AA are able to select, sort, organize and access past data 202 based on the type of event that is encountered, the data category indicator 208, the data-type indicator 210, and/or the time stamp.

Figure 6:
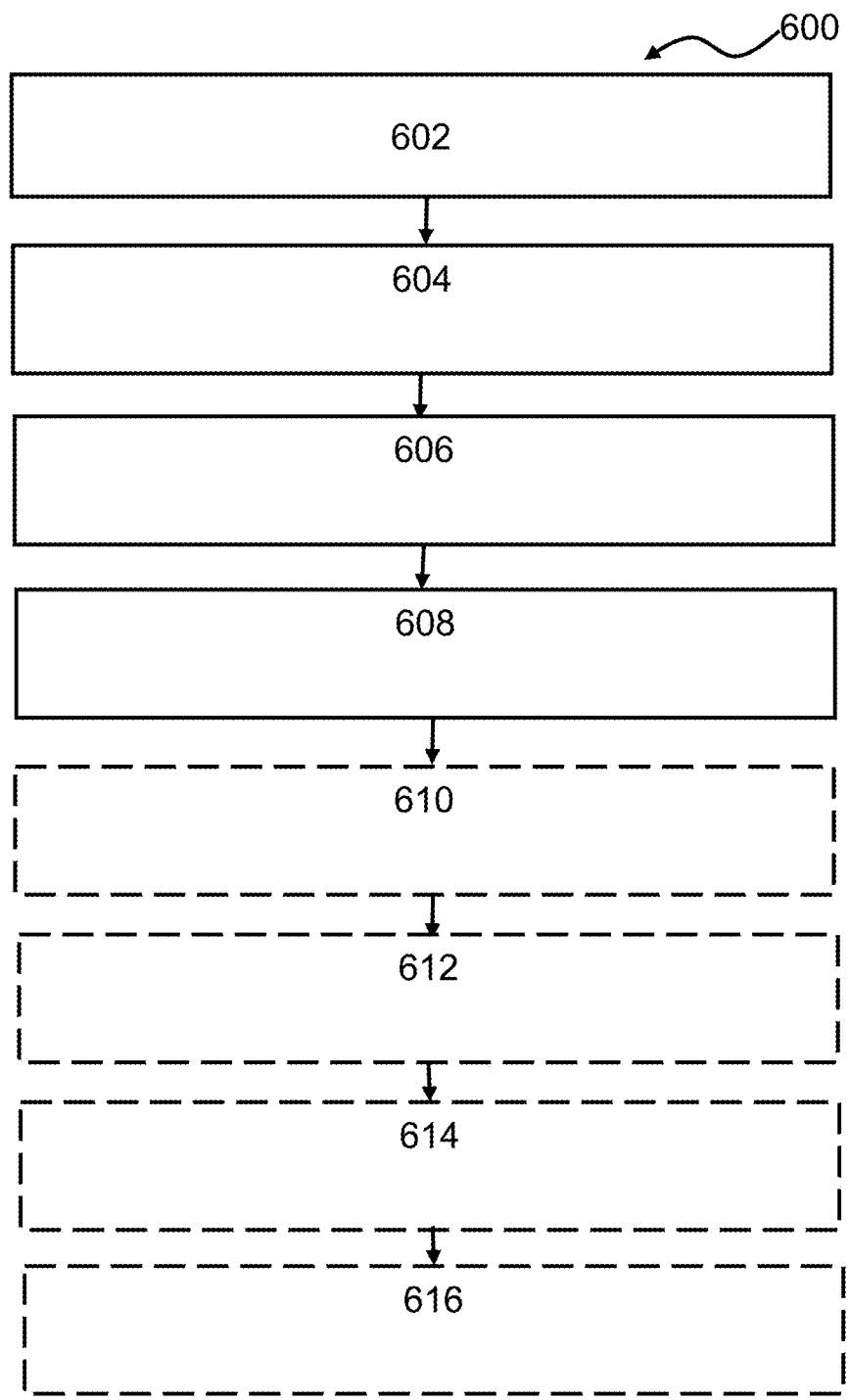
FIG. 6 diagrammatically shows an example of a method or process for managing the temperature of a module of a production line according to the invention.

With reference to the non-limiting example that is shown in FIG. 6, the course of a process 600 (or a method) for management of a main module of a production line is shown diagrammatically, with said line comprising at least one module that is located upstream or downstream from said main module, said main module being equipped with thermal means that operate in production at a setpoint temperature. The method 600 includes: during production, when a stoppage in the production continuity takes place at said main module over a period, the temperature of said thermal means is lowered 602. The method 600 includes that the temperature of said thermal means is reset 604 until said setpoint temperature (1000) is reached. The method 600 includes that data comprising at least past data are recorded 606, with said past data regarding at least one past event and comprising at least one temperature rise time of said thermal means from a first temperature to a second temperature. The method 600 includes that the temperature of said thermal means is automatically adapted 608, based on said data, until said setpoint temperature is reached, at the latest when the production continuity resumes at said main module.

The recording 606 of data, in particular of past data regarding at least one past event, preferably multiple past events, makes it possible that when a new, similar or identical event, such as a stoppage, takes place on the production line, at one and/or the other of said modules, the previously recorded past data regarding a similar or identical past event are recovered, which past data can thus be applied in step 608. If the event is new, it is possible to compare the past data with data that are measured regarding the event in progress, and optionally to record the measured data, relative to the event that takes place and alters the production. The recording 606 of data can include one or more measurements of the temperature of said thermal means. These measurements can be performed continuously or at regular or irregular intervals. Thus, in addition to knowing the temperature of the thermal means, the method 600 includes the fact that a determination is made on a lapse of time that it takes to raise the temperature of said furnace and to adapt this lapse of time gradually and continually. Thus, in particular, the aging of said thermal means can be compensated, and it is possible to calculate with an improved precision and in real time the temperature rise speed of the thermal means. The recording 606 of said length of time can be carried out by regular or irregular temperature intervals, with the lower and upper bounds of such intervals being respectively the first and second temperatures. Such intervals therefore represent a length of time between a delta of two temperatures, said first temperature and said second temperature.

The method 600 can include, based on said rise time, determining a rising curve, which may or may not be smoothed, in the form of segments of straight lines corresponding to said intervals, modeling the temperature of the thermal means based on time. In particular, the method 600 can include determining the guide coefficients of each of the segments of straight lines, performing linear extrapolations between two times or two temperature values, or else calculating mean curves between two points. Thus, starting from any temperature value of the thermal means, the method 600 makes it possible to know the time that it takes to reach the value of the setpoint temperature.

The method 600 can include that known data are recorded 610, in addition within said data, with said known data relating to a setpoint and comprising: a planned length of time for stoppage of the travel of products along said production line; and/or a length of time that is estimated and acquired by an operator.

The method 600 can include that multiple values from the same past data category are recorded 612 and that the most unfavorable value is applied to adapt the temperature of said thermal means automatically.

The method 600 can include that the oldest value from the same category of past data is replaced 614 by a newly-recorded value.

The method 600 can include that the data are recorded continuously during production and in real time and that these data are recorded as or with the past data.

The method 600 can be characterized in that said thermal means of the main module comprise associated means and in that the operation of said associated means is modified 616 based on said data over said period of said stoppage.

The method 600 can include that based on obtaining (thanks to past data) in advance the rise in temperature of the thermal means and the length of time for carrying out this rise, a reduction and then a rise in said temperature are anticipated according to values that are determined in advance or adjusted in real time, matching them up throughout the period of the stoppage.

The method 600 can include that a distinction is made between problems that take place at the main module and problems that take place at other upstream and/or downstream modules. Actually, an interruption at an upstream and/or downstream module gives rise in particular to a length of time of routing products up to the main module, which can be estimated by the management means.

The method 600 can include that the starting point of the temperature rise is determined based on the lapse of time remaining in the period of the stoppage, but also based on the rise time this low temperature reached up to said setpoint temperature.

The invention claimed is:

1. Method for managing a main module (1) of a product production line, with said line comprising at least one module that is located upstream or downstream (3) from said main module (1), with said main module (1) being equipped with thermal means that operate in production at a setpoint temperature (1000), method in which:

lowering the temperature of said thermal means during production, when there is a break in production continuity at said main module (1) over a period of time;

resetting the temperature of said thermal to said setpoint temperature (1000);

wherein:

recording data comprising past data, with said past data comprising at least one similar past event that has taken place during product production and comprising at least one temperature rise time of said thermal means from a first temperature to a second temperature;

adjusting, based on said data, the temperature of said thermal means automatically to reach said setpoint temperature (1000), at the latest when the production continuity resumes at said main module (1).

2. Management method according to claim 1, wherein said past data comprises:

a prior length of time during which the temperature of said thermal means was lowered and then reset;

a length of time of resolution, during which a specific problem that took place at said main module (1), said upstream and/or downstream module (3), has been resolved; and/or a length of time that it takes for production to resume between said main module (1), an upstream and/or downstream module (3).

3. Management method according to claim 1, wherein known data are recorded in addition within said data, with said known data relating to a setpoint and comprising:

a planned length of time for stoppage of the travel of products along said product production line; and/or a length of time that is estimated and acquired by an operator.

4. Management method according to claim 1, wherein multiple values from the same past data category are recorded, and the most unfavorable value among the multiple values is applied for adapting the temperature of said thermal means automatically.

5. Management method according to claim 4, wherein the oldest value from the same past data category is replaced by a newly-recorded value.

6. Management method according to claim 1, wherein said thermal means of the main module (1) comprises an associated means, and wherein the operation of said associated means is modified based on said data over said period of said stoppage.

7. Management method according to claim 2, wherein known data are recorded in addition within said data, with said known data relating to a setpoint and comprising:

a planned length of time for stoppage of the travel of products along said product production line; and/or a length of time that is estimated and acquired by an operator.

8. Management method according to claim 2, wherein multiple values from the same past data category are recorded, and the most unfavorable value is applied for adapting the temperature of said thermal means automatically.

9. Management method according to claim 3, wherein multiple values from the same past data category are recorded, and the most unfavorable value is applied for adapting the temperature of said thermal means automatically.

10. Management method according to claim 2, wherein said thermal means of the main module (1) comprise associated means, and wherein the operation of said associated means is modified based on said data over said period of said stoppage.

11. Management method according to claim 3, wherein said thermal means of the main module (1) comprise associated means, and wherein the operation of said associated means is modified based on said data over said period of said stoppage.

12. Management method according to claim 4, wherein said thermal means of the main module (1) comprise associated means, and wherein the operation of said associated means is modified based on said data over said period of said stoppage.

13. Management method according to claim 5, wherein said thermal means of the main module (1) comprise associated means, and wherein the operation of said associated means is modified based on said data over said period of said stoppage.

14. Management method according to claim 7, wherein multiple values from the same past data category are recorded, and the most unfavorable value is applied for adapting the temperature of said thermal means automatically.

15. Management method according to claim 7, wherein said thermal means of the main module (1) comprise associated means, and wherein the operation of said associated means is modified based on said data over said period of said stoppage.

16. Management method according to claim 8, wherein said thermal means of the main module (1) comprise associated means, and wherein the operation of said associated means is modified based on said data over said period of said stoppage.

17. Device for managing at least one main module within a product production line, with said main module (1) comprising thermal means and means (5) for monitoring at least the temperature of said thermal means, wherein said device comprises management means (6) having:

a means for recording data including past data, with said past data comprising at least one similar past event that has taken place during product production and comprising at least one temperature rise time of said thermal means from a first temperature to a second temperature;

an automatic control means of said monitoring means (5) adjusting said temperature of the thermal means based on said data.

18. Management device according to claim 17, wherein said recording means comprise means for selecting values for each of said past data.

19. Management device according to claim 17, further comprising a means (8) for detecting a stoppage that takes place at said main module (1) and/or an interruption at said upstream and/or downstream module (3).

20. Management device according to claim 18, further comprising means (8) for detecting a stoppage that takes place at said main module (1) and/or an interruption at said upstream and/or downstream module (3).

* * * * *